000# United States Patent Office 3,481,949
Patented Dec. 2, 1969

3,481,949
BIS(OXADIAZOLE) DERIVATIVES
Eric Royle Lynch, Llangollen, and William Cummings,
Marford, Wales, assignors to Monsanto Chemicals
Limited, London, England, a British company
No Drawing. Filed Aug. 5, 1966, Ser. No. 570,442
Claims priority, application Great Britain, Aug. 19, 1965,
35,589/65
Int. Cl. C07d 85/54
U.S. Cl. 260—307                                    3 Claims

ABSTRACT OF THE DISCLOSURE

Bis(oxadiazole) derivatives having the formula

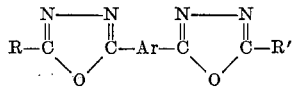

in which R and R' each represent a phenyl or naphthyl group, optionally fluorinated; or a phenyl group having a second phenyl group or optionally fluorinated phenyl group linked to the first directly or through an oxygen or sulphur atom or through as methylene, carbonyl or sulphonyl group and in which Ar is a phenylene or naphthalene radical, optionally fluorinated; or a radical containing two optionally fluorinated benzene nuclei linked to each other directly or through an oxygen or sulphur atom or through a methylene, carbonyl or sulphonyl group; provided that at least one of R, R' and Ar contains fluorine.

---

This invention relates to new chemical compounds, in particular to compounds containing heterocyclic and fluoroaromatic groups.

The compounds, which have good thermal stability and are therefore useful as components in compositions that are exposed to high operating temperatures, for example heat transfer fluids, are bis(oxadiazole) derivatives having the formula:

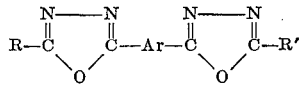

where R and R' each represent an aromatic or fluoroaromatic group and Ar represents a divalent aromatic or fluoroaromatic radical, provided that at least one of R, R' and Ar contains fluorine.

The groups R and R', and the radical Ar can each contain one or more aromatic nuclei, each of which (subject to the above proviso) may be unsubstituted or may contain one or more fluorine atoms as nuclear substituents. Where a nucleus contains fluorine, it is preferably one that is fully fluorinated; a group R or R' can for example be a fluorophenyl group, and it is then preferably a pentafluorophenyl group.

The invention includes a process for the production of a bis(oxadiazole) derivative of the above formula, in which a bis(hydrazide) having the formula:

R—CO.NHNH.CO—Ar—CO.NHNH.CO—R' where R, R' and Ar have the same significance as in the formula of the product is dehydrated.

In respect of R and R', the preferred bis(oxadiazole) derivatives are those where these groups are phenyl or fluorophenyl groups, and in respect of radical Ar, the preferred bis(oxadiazole) derivatives are compounds where this is a phenyl or fluorophenylene radical.

More generally, however, the groups R and R' can each be for example a naphthyl or fluoronaphthyl group or a group containing two optionally fluorinated benzene nuclei linked to each other directly or through an intermediate atom or group, for instance an oxygen or sulphur atom or a methylene, carbonyl or sulphonyl group. Examples of such groups are biphenylyl, nonafluorobiphenylyl, phenoxyphenyl, (pentafluorophenoxy) phenyl, nonafluorophenoxyphenyl, nonafluorophenylthiophenyl, (pentafluorobenzyl) phenyl, (pentafluorobenzoyl) phenyl and nonafluorobenzenesulphonylphenyl groups.

Moreover, in the more general class of bis(oxadiazole) derivatives, Ar can be for example an optionally fluorinated naphthylene radical, or a radical containing two optionally fluorinated inter-linked benzene nuclei as described above with reference to the radical R, for example a 4,4'-octafluorobiphenylylene radical.

Specific examples of the new compounds of the invention are:

1(2'-phenyl-1',3',4'-oxadiazoyl-5')-3(2'-pentafluorophenyl-1',3',4'-oxadiazoyl-5')benzene;
1,3-bis(2'-pentafluorophenyl-1',3',4'-oxadiazoyl-5') benzene;
1,3-bis(2'-pentafluorophenyl-1',3',4'-oxadiazoyl-5') tetrafluorobenzene;
1,4-bis(2'-pentafluorophenyl-1',3',4'-oxadiazoyl-5')- tetrafluorobenzene;
1,4-bis(2'-nonafluoro-p-biphenylyl-1',3',4'-oxadiazolyl-5'-tetrafluorobenzene;
3,3'-bis(2"-nonafluoro-m-phenoxyphenyl-1",3",4"- oxadiazoylyl-5")biphenyl;
4,4'-bis(2"-pentafluorophenyl-1",3",4"-oxadiazolyl-5") octafluorobenzophenone; and
4,4'-bis(2"-pentafluorophenyl-1",3",4"-oxadiazolyl-5") diphenyl sulphone.

The groups R and R', and the radical Ar in the bis (hydrazide) that is dehydrated in the process of the invention are of course the same as those in the required product. Thus, for the production of the preferred bis (oxadiazole) derivatives in which each of R and R' is a phenyl or fluorophenyl group and Ar is a phenylene or fluorophenylene radical, the starting materials are the phthaloyl bis(benzhydrazides) where fluorine is present in one or more of the benzene nuclei as appropriate.

The dehydration of the bis(hydrazide) can be effected simply by heating, but it is preferred to employ a dehydrating agent. Phosphorus pentoxide and the phosphorus oxyhalides for instance phosphorus oxychloride have been found to be very effective for this purpose, but other dehydrating agents can be used, for example polyphosphoric acid, concentrated sulphuric acid, sulphur trioxide/dimethyl formamide complex, thionyl chloride or ethyl orthoformate. The dehydration can, if desired, be carried out in an inert solvent. The temperature at which the process is operated may vary according to the presence or absence of a dehydrating agent, and the nature of the dehydrating agent if one is employed, but is generally within the range 50 to 300° C. In the absence of a dehydrating agent, the process is advantageously carried out at a relatively high temperature, for example one in the range 200 to 300° C. under reduced pressure. Temperatures in the same range can also be employed where a relatively non-volatile dehydrating agent, for example phosphorus pentoxide, is used. In instances where the dehydrating agent is a liquid having a boiling point within the desired dehydrating temperature range, the process can conveniently be conducted by boiling a mixture of the hydrazine derivative and the dehydrating agent under reflux at atmosphere pressure. Pressures in excess of atmospheric can be employed if desired, however.

Those of the new compounds of the invention that contain nuclear hydrogen atoms in one or more of the groups R and R' or in the radical Ar can be used as starting materials for the production of polyaromatic resins by reaction with aromatic polysulphonyl halides according to the process described in our British Patent Specification No. 1,037,111. In such resins, the characteristic high thermal stability of the present bis(oxadiazole) derivatives is retained.

The invention is illustrated by the following examples.

Example 1

This example describes the production of the new compound 1,3-bis(2'-pentafluorophenyl-1',3',4' - oxadiazolyl-5')tetrafluorobenzene.

A mixture of 5 grams of tetrafluoroisophthaloyl bis(pentafluorobenzhydrazide) (obtained from tetrafluoroisophthaloyl chloride and pentafluorobenzhydrazide) and 125 cc. of phosphorus oxychloride was stirred under reflux on a steam bath for 18 hours.

Phosphorus oxychloride was then distilled off, ice was added to the residue, and after the ice had melted the suspension thus obtained was filtered. The solid which was collected on the filter was washed with water until free of acid and then dried, giving 4.6 grams of crude 1,3-bis-(2'-pentafluorophenyl-1',3',4' - oxadiazolyl-5')tetrafluorobenzene having a melting point of 189 to 193° C. Crystallization from 2-ethoxyethanol followed by recrystallization from a mixture of benzene and 60–80 petroleum ether raised the melting point to 194.5 to 195.5° C. (Found: C, 42.9; H, 0.0; F, 42.8; N, 9.1. $C_{22}F_{14}N_4O_2$ requires C, 42.7; H, 0.0; F, 43.0; N, 9.1%.)

Example 2

This example describes the production of the new compound 1,4-bis(2'-pentafluorophenyl-1',3',4' - oxadiazolyl-5')tetrafluorobenzene.

A mixture of 1 gram of tetrafluoroterphthaloyl bis(pentafluorobenzhydrazide) (obtained from tetrafluoroterephthaloyl chloride and pentafluorobenzhydrazide) and 25 cc. of phosphorus oxychloride was stirred under reflux on a steam bath for 17 hours. Phosphorus oxychloride was then distilled off under reduced pressure giving a residual gum, from which, after stirring with ethanol, 0.76 gram of crude 1,4-bis(2'-pentafluorophenyl-1',3',4'-oxadiazolyl-5')tetrafluorobenzene were obtained as a buff-colored solid having a melting point of 290 to 291° C. Two crystallizations from xylene raised the melting pooint to 290.5 to 291.5° C. (Found: C, 42.9; H, 0.05; F, 42.85; N, 9.1. $C_{22}F_{14}N_4O_2$ requires C, 42.7; H, 0.00; F, 43.0; N, 9.1%.)

It is to be understood that although the invention has been described with specific reference to particular embodiments thereof, it is not to be so limited since changes and alterations therein may be made which are within the full intended scope of this invention as defined by the appended claims.

What we claim is:

1. A bis(oxadiazole) derivature having the formula

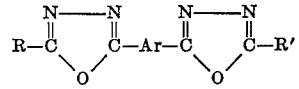

in which each of the groups R and R' is a phenyl or naphthyl group; or a phenyl or naphthyl group containing one or more fluorine atoms as nuclear substituents; or a phenyl group having a second phenyl group or optionally fluorinated phenyl group linked to the first directly or through an oxygen or sulphur atom or through a methylene, carbonyl or sulphonyl group; and in which Ar is a phenylene or naphthylene radical; or a phenylene or naphthylene radical containing one or more fluorine atoms as nuclear substituents; or a radical containing two optionally fluorinated benzene nuclei linked to each other directly or through an oxygen or sulphur atom or through a methylene, carbonyl or sulphonyl group; provided that at least one of R, R' and Ar contains fluorine.

2. A compound according to claim 1 in which any phenyl, naphthyl, phenylene or naphthylene group that contains fluorine is fully fluorinated.

3. A compound according to claim 1, in which R and R' each represent a phenyl or pentafluorophenyl group and Ar represents a phenylene or tetrafluorophenylene group.

References Cited

UNITED STATES PATENTS

| 3,065,238 | 11/1962 | Weidinger et al. | 260—307 |
| 2,765,304 | 10/1956 | Siegrist et al. | 260—307 |

ALTON D. ROLLINS, Primary Examiner

U.S. Cl. X.R.

252—67; 260—79.3, 558